US008209268B2

(12) United States Patent
Zelenko (10) Patent No.: US 8,209,268 B2
(45) Date of Patent: Jun. 26, 2012

(54) SYSTEM AND METHOD FOR VARIANT STRING MATCHING

(75) Inventor: Dmitry Zelenko, Fairfax, VA (US)

(73) Assignee: SRA International, Inc., Fairfax, VA (US)

(*) Notice: Subject to any disclaimer, the term of this patent is extended or adjusted under 35 U.S.C. 154(b) by 742 days.

(21) Appl. No.: 12/359,924

(22) Filed: Jan. 26, 2009

(65) Prior Publication Data

US 2009/0216689 A1    Aug. 27, 2009

Related U.S. Application Data

(60) Provisional application No. 61/006,646, filed on Jan. 24, 2008.

(51) Int. Cl.
*G06F 15/18*    (2006.01)
(52) U.S. Cl. ............... 706/12; 706/45; 706/46; 706/47; 706/48; 706/62; 704/1; 704/200; 704/231
(58) Field of Classification Search ................ None
See application file for complete search history.

(56) References Cited

U.S. PATENT DOCUMENTS

| | | | |
|---|---|---|---|
| 5,579,436 A | 11/1996 | Chou et al. | |
| 6,192,337 B1 | 2/2001 | Ittycheriah et al. | |
| 6,359,574 B1 * | 3/2002 | Yariv | 341/50 |
| 6,571,199 B1 * | 5/2003 | Floratos et al. | 702/179 |
| 6,687,697 B2 * | 2/2004 | Collins-Thompson et al. | 1/1 |
| 7,254,774 B2 * | 8/2007 | Cucerzan et al. | 715/257 |
| 7,636,703 B2 * | 12/2009 | Taylor | 706/62 |
| 8,015,166 B2 * | 9/2011 | Ding | 707/702 |
| 8,055,498 B2 * | 11/2011 | El-Shishiny et al. | 704/10 |
| 2004/0181527 A1 * | 9/2004 | Burdick et al. | 707/6 |
| 2005/0273468 A1 * | 12/2005 | Hermansen et al. | 707/100 |
| 2006/0179052 A1 | 8/2006 | Pauws et al. | |
| 2008/0091413 A1 * | 4/2008 | El-Shishiny et al. | 704/10 |
| 2008/0208854 A1 * | 8/2008 | Badr et al. | 707/6 |
| 2009/0182728 A1 * | 7/2009 | Anderson | 707/5 |
| 2009/0234826 A1 * | 9/2009 | Bidlack | 707/5 |

OTHER PUBLICATIONS

International Search Report with Written Opinion, dated Jun. 1, 2009, received in international patent application No. PCT/US09/32034, 10 pgs.

* cited by examiner

*Primary Examiner* — Omar Fernandez Rivas
(74) *Attorney, Agent, or Firm* — Holland & Knight LLP; John P. Moran, Esq.

(57) ABSTRACT

A method, computer program product, and system for variant string matching. A computer implemented method for variant string matching may comprise comparing with a computing device two unidentical strings in a training variant string pair. The two unidentical strings may represent the same item from training data, which may be stored in a memory. The two unidentical strings may be compared to determine if they include an identical substring pair, and a first unidentical substring pair. The computer implemented method may also determine if the first unidentical substring pair includes a first unidentical substring and a second unidentical substring. The computer implemented method may further determine if the first unidentical substring pair is in the training data. The first unidentical substring pair may be entered into the training data as a first variant string pair if it is not in the training data.

14 Claims, 8 Drawing Sheets

SYSTEM AND METHOD FOR VARIANT STRING MATCHING

RELATED APPLICATIONS

This application claims priority to provisional application Ser. No. 61/006,646 filed on Jan. 24, 2008, which is herein incorporated by reference in its entirety.

TECHNICAL FIELD

The present invention relates to variant string matching systems and, more particularly to applications of variant string matching systems.

BACKGROUND

Foreign name matching is an important practical problem in information retrieval and integration. Names transliterated and translated from foreign languages may often exhibit a large number of orthographic variations. Therefore, integrating data sources with foreign names or searching for a foreign name may require intelligent name matching—the process that may determine whether different names are likely to correspond to the same entity.

There appears to have been work on approximate string matching and searching algorithms. The work appears mostly to address using edit distance in search for approximate names. There also appears to have been work on record linkage. Further, adaptive work on merging names and database records appears to attempt to learn probabilistic edit distance with affine gaps for name matching. However, the edit distance may be defined in terms of single characters, which may be unlikely to work well in general cross-cultural name matching.

SUMMARY OF THE DISCLOSURE

In a first implementation a computer implemented method for variant string matching may comprise comparing with a computing device two unidentical strings in a training variant string pair. The two unidentical strings may represent the same item from training data, which may be stored in a memory. The two unidentical strings may be compared to determine if they include an identical substring pair, and a first unidentical substring pair. The computer implemented method may also determine if the first unidentical substring pair includes a first unidentical substring and a second unidentical substring. The computer implemented method may further determine if the first unidentical substring pair is in the training data. The first unidentical substring pair may be entered into the training data as a first variant string pair if it is not in the training data.

One or more of the following features may be included. The two unidentical strings may be compared with the computing device to determine if they include an interchangeable substring pair and a second unidentical substring pair. It also may be determined if the second unidentical substring pair including a third unidentical substring and a fourth unidentical substring. It may be determined if the second unidentical substring pair is in the training data; and the second unidentical substring pair may be entered into the training data as a second variant string pair if it is not in the training data.

A number of counters may be configured to increment with the computing device, and any or all of the counters may be incremented. For example, a first pair counter may be configured to increment if the first unidentical substring pair is in the training data. A first substring counter may be configured to increment if the first unidentical substring is in the training data. A second substring counter may be configured to increment if the second unidentical substring is in the training data. A second pair counter may be configured to increment if the second unidentical substring pair is in the training data. A third substring counter may be configured to increment if the third unidentical substring is in the training data. A fourth substring counter may be configured to increment if the fourth unidentical substring is in the training data. A matching score may be generated for at least one variant string pair in the training data with the computing device. The matching score may be based upon, at least in part, at least one of the first pair counter, the first substring counter, the second substring counter, the second pair counter, the third substring counter, and the fourth substring counter. The computer implemented method may further comprise generating with the computing device a string distance for at least one variant string pair in the training data. The string distance may be based upon, at least in part, a matching score generated for at least one of the first unidentical substring pair and the second unidentical substring pair.

A computer implemented method may further include searching, for a string which may have at least one substring, with the computing device. The at least one substring may have at least one variant string and may be included in the training data. In another implementation, a computer implemented method may include merging a plurality of strings from at least two sources into one source based upon, at least in part, the matching score for at least one variant string pair, which may have a first substring in a first source and a second substring in a second source. Still another implementation may include dynamically displaying a variant display string in a graphical user interface, based upon, at least in part, a variant display string pair which may include the variant display string and a string in the graphical user interface.

In a second implementation, a computer program product residing on a computer readable medium which may have a plurality of instructions stored on it may be provided. When executed by a processor, the instructions may cause the processor to perform operations comprising comparing two unidentical strings in a training variant string pair, the two unidentical strings representing the same item from training data in a memory, to determine if they include an identical substring pair and a first unidentical substring pair including a first unidentical substring and a second unidentical substring. The computer program product may further include instructions for determining if the first unidentical substring pair is in the training data. The computer program product may also include instructions for entering the first unidentical substring pair into the training data as a first variant string pair if it is not in the training data.

One or more of the following features may be included. The computer program product may include instructions for comparing the two unidentical strings to determine if they include an interchangeable substring pair and a second unidentical substring pair including a third unidentical substring and a fourth unidentical substring. The computer program product may further include instructions for determining if the second unidentical substring pair is in the training data. The computer program product may also further include instructions for entering the second unidentical substring pair into the training data as a second variant string pair if it is not in the training data.

In some implementations a computer program product may further include instructions for incrementing at least one of a first pair counter configured to increment if the first unidentical substring pair is in the training data, a first substring counter configured to increment if the first unidentical substring is in the training data, a second substring counter configured to increment if the second unidentical substring is in the training data, a second pair counter configured to increment if the second unidentical substring pair is in the training data, a third substring counter configured to increment if the third unidentical substring is in the training data and a fourth substring counter configured to increment if the fourth unidentical substring is in the training data. The computer program product may also include instructions for generating a matching score for at least one variant string pair in the training data, based upon, at least in part, at least one of the first pair counter, the first substring counter, the second substring counter, the second pair counter, the third substring counter, and the fourth substring counter. The computer program product may also comprise generating with the computing device a string distance for at least one variant string pair in the training data. The string distance may be based upon, at least in part, a matching score generated for at least one of the first unidentical substring pair and the second unidentical substring pair.

In some implementations a computer program product may further include instructions for searching for a string having at least one substring, the at least one substring having at least one variant string included in the training data. The computer program product may also include instructions for generating at least one result including the at least one variant string. Moreover, the computer program product may include instructions for merging a plurality of strings from at least two sources into one source based upon, at least in part, the matching score for at least one variant string pair having a first substring in a first source and a second substring in a second source. Additionally, the computer program product may include instructions for dynamically displaying a variant display string in a graphical user interface, based upon, at least in part, a variant display string pair including the variant display string and a string in the graphical user interface.

In a third implementation a computing system is provided. The computing system may include a processor and a memory architecture coupled with the processor. The computing system may also include a first software module executed on the at least one processor and the at least one memory architecture, wherein the first software module is configured to compare two unidentical strings in a training variant string pair, the two unidentical strings representing the same item from training data, to determine if they include an identical substring pair and a first unidentical substring pair including a first unidentical substring and a second unidentical substring. The computing system may further include a second software module executed on the at least one processor and the at least one memory architecture, wherein the second software module is configured to determine if the first unidentical substring pair is in the training data. The computing system may additionally include a third software module executed on the at least one processor and the at least one memory architecture, wherein the third software module is configured to enter the first unidentical substring pair into the training data as a first variant string pair if it is not in the training data.

In some implementations, the computing system may include a fourth software module executed on the at least one processor and the at least one memory architecture, wherein the fourth software module is configured to compare the two unidentical strings to determine if they include an interchangeable substring pair and a second unidentical substring pair including a third unidentical substring and a fourth unidentical substring. The computing system may further include a fifth software module executed on the at least one processor and the at least one memory architecture, wherein the fifth software module is configured to determine if the second unidentical substring pair is in the training data. The computing system may also include a sixth software module executed on the at least one processor and the at least one memory architecture, wherein the sixth software module is configured to enter the second unidentical substring pair into the training data as a second variant string pair if it is not in the training data.

The computing system may further include a seventh software module executed on the at least one processor and the at least one memory architecture, wherein the seventh software module is configured to increment at least one of at least one of a first pair counter configured to increment if the first unidentical substring pair is in the training data, a first substring counter configured to increment if the first unidentical substring is in the training data, a second substring counter configured to increment if the second unidentical substring is in the training data, a second pair counter configured to increment if the second unidentical substring pair is in the training data, a third substring counter configured to increment if the third unidentical substring is in the training data and a fourth substring counter configured to increment if the fourth unidentical substring is in the training data. The computing system may also include instructions for generating a matching score for at least one variant string pair in the training data, based upon, at least in part, at least one of the first pair counter, the first substring counter, the second substring counter, the second pair counter, the third substring counter, and the fourth substring counter.

In some implementations, the computing system may include an eighth software module executed on the at least one processor and the at least one memory architecture, wherein the eighth software module is configured to generate a matching score for at least one variant string pair in the training data, based upon, at least in part, at least one of the first pair counter, the first substring counter, the second substring counter, the second pair counter, the third substring counter, and the fourth substring counter.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable non-transitory computer usable or computer readable medium may be utilized. The computer-usable or computer-readable medium may be, for example but not limited to, an electronic, magnetic, optical, electromagnetic, infrared, or semiconductor system, apparatus, or device. More specific examples (a non-exhaustive list) of the non-transitory computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Various other non-transitory computer readable media may be used as well.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
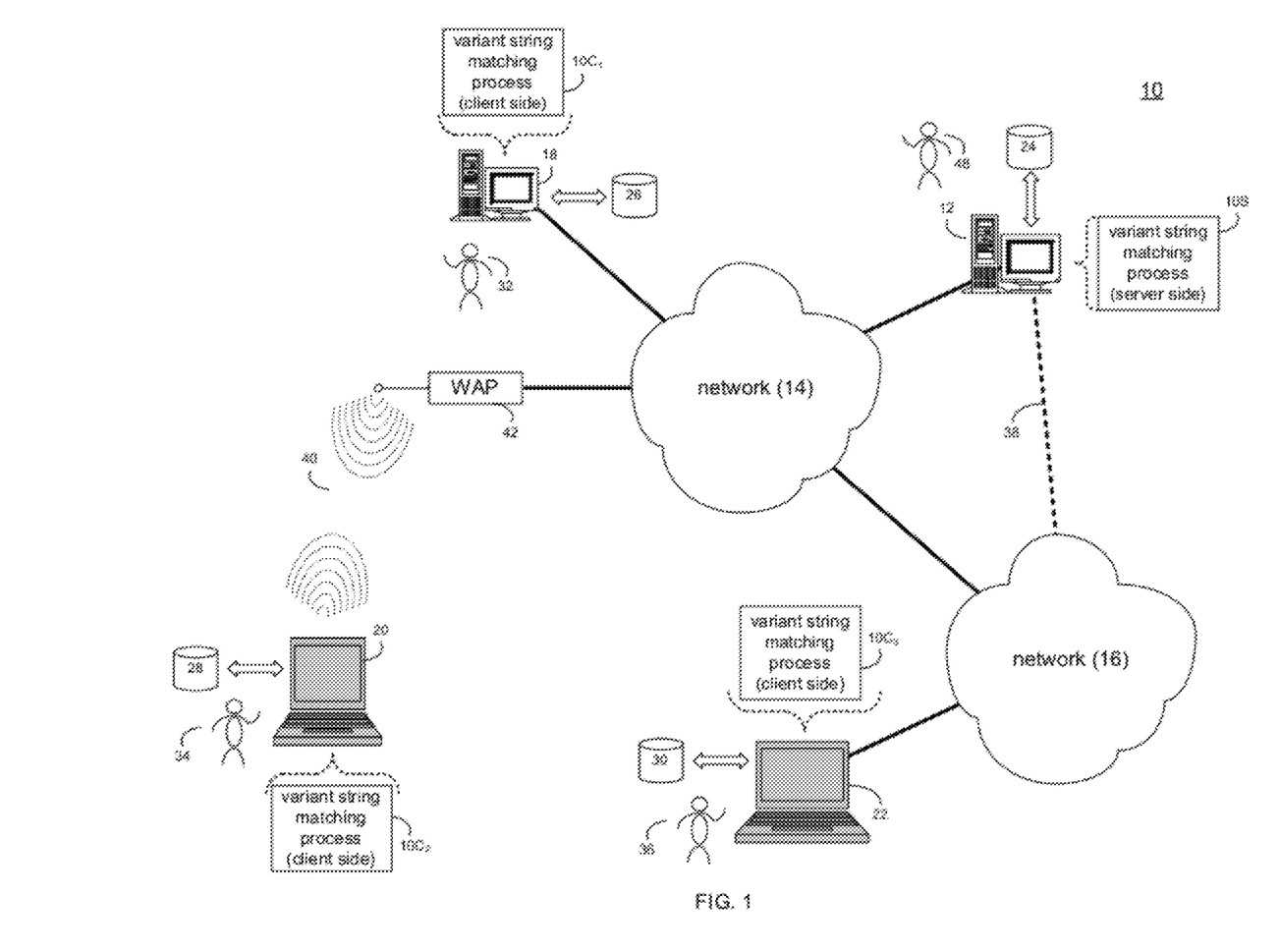
FIG. 1 is a diagrammatic view of one embodiment of a variant string matching process coupled to a distributed computing network.

Referring now to FIG. 1, there is shown variant string matching process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example.

Server computer 12 may execute a web server application (not shown), examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 16), examples of which may include but are not limited to: a local area network; a wide area network; or an intranet, for example.

As will be discussed below in greater detail, variant string matching process 10 may compare two unidentical strings in a training variant string pair. The two unidentical strings may represent the same item from training data, which may be stored in a memory. The two unidentical strings may be compared to determine if they include an identical substring pair, and a first unidentical substring pair. Further, variant string matching process 10 may also determine if the first unidentical substring pair includes a first unidentical substring and a second unidentical substring. It may also determine if the first unidentical substring pair is in the training data. The first unidentical substring pair may be entered into the training data as a first variant string pair if it is not in the training data.

Variant string matching process 10 may be a server-side process (e.g., server-side data reporting process 10S) executed on a computing device, e.g. server computer 12; a client side process (client-side variant string matching process 10C$_1$, variant string matching process 10C$_2$, client-side variant string matching process 10C$_3$) executed on a computing device, e.g. a client electronic device (e.g., desktop computer 18, laptop computer 20, notebook computer 22, a personal digital assistant (not shown), a data-enabled, cellular telephone (not shown), and a dedicated network device (not shown), for example); or a hybrid server-side/client-side process that e.g., utilizes variant string matching process 10S and at least one of client-side variant string matching process 10C$_1$, client-side variant string matching process 10C$_2$, and client-side variant string matching process 10C$_3$ to effectuate the functionality of variant string matching process 10.

The instruction sets and subroutines of variant string matching process 10S, which may be stored on storage device 24 coupled to server computer 12, may be executed by one or more processors (not shown) and one or more memory architectures (not shown) incorporated into server computer 12. Storage device 24 may include but is not limited to: a hard disk drive; a tape drive; an optical drive; a RAID array; a random access memory (RAM); and a read-only memory (ROM).

The instruction sets and subroutines of variant string matching process $10C_1$, which may be stored on storage device 26 coupled to desktop computer 18, may be executed by one or more processors (not shown) and one or more memory architectures (not shown) incorporated into desktop computer 18. Storage device 26 may include but is not limited to: hard disk drives; tape drives; optical drives; RAID arrays; random access memories (RAM); read-only memories (ROM), compact flash (CF) storage devices, secure digital (SD) storage devices, and memory stick storage devices.

The instruction sets and subroutines of variant string matching process $10C_2$, which may be stored on storage device 28 coupled to laptop computer 20, may be executed by one or more processors (not shown) and one or more memory architectures (not shown) incorporated into laptop computer 20. Storage device 28 may include but is not limited to: hard disk drives; tape drives; optical drives; RAID arrays; random access memories (RAM); read-only memories (ROM), compact flash (CF) storage devices, secure digital (SD) storage devices, and memory stick storage devices.

The instruction sets and subroutines of variant string matching process $10C_3$, which may be stored on storage device 30 coupled to notebook computer 22, may be executed by one or more processors (not shown) and one or more memory architectures (not shown) incorporated into notebook computer 22. Storage device 30 may include but is not limited to: hard disk drives; tape drives; optical drives; RAID arrays; random access memories (RAM); read-only memories (ROM), compact flash (CF) storage devices, secure digital (SD) storage devices, and memory stick storage devices.

Using client-side variant string matching process $10C_1$, client-side variant string matching process $10C_2$, and client-side variant string matching process $10C_3$, users 32, 34, 36 (respectively) may access server-side variant string matching process 10S and effectuate the functionality of variant string matching process 10.

Users (e.g., users 32, 34) may access server computer 12 (i.e., the computer that executes server-side variant string matching process 10S) directly through network 14. Additionally/alternatively, server computer 12 may be connected to network 14 through secondary network 16 (as illustrated with link line 38; shown in phantom) and, therefore, users (e.g., user 36) may access server computer 12 via network 16.

The various client electronic devices may be directly or indirectly coupled to network 14 (or network 16). For example, personal computer 18 is shown directly coupled to network 14 via a hardwired network connection. Further, notebook computer 22 is shown directly coupled to network 16 via a hardwired network connection. Laptop computer 20 is shown wirelessly coupled to network 14 via wireless communication channel 40 established between laptop computer 20 and wireless access point (i.e., WAP) 42, which is shown directly coupled to network 14. WAP 42 may be, for example, an IEEE 802.11a, 802.11b, 802.11g, Wi-Fi, and/or Bluetooth device that is capable of establishing wireless communication channel 40 between laptop computer 18 and WAP 42.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 18, 20, 22 may each execute an operating system, examples of which may include but are not limited to Microsoft Windows™, Microsoft Windows CE™, Redhat Linux™, or a custom operating system.

Variant String Matching Process

Figure 2:
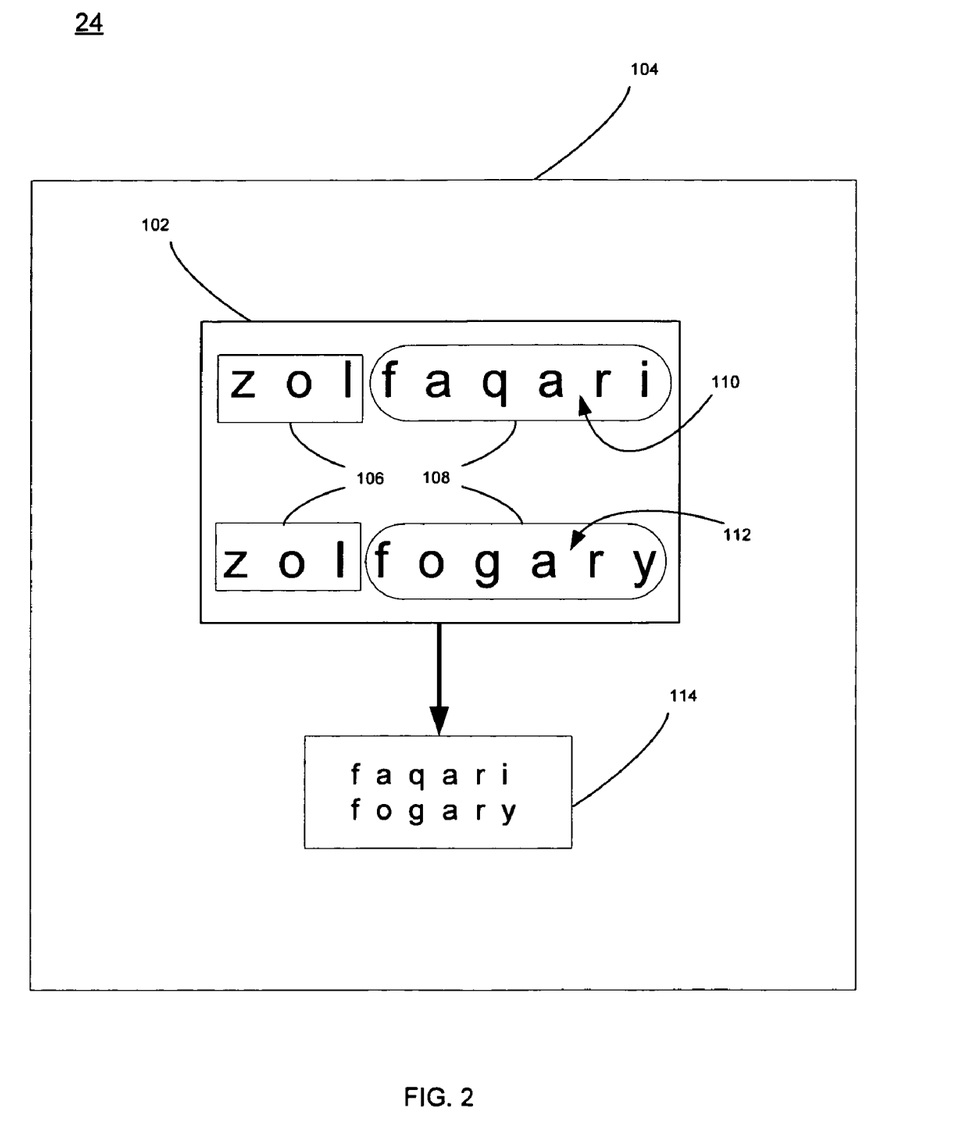
FIG. 2 is a more-detailed diagrammatic view of an embodiment of the variant string matching process of FIG. 1.
Figure 6:
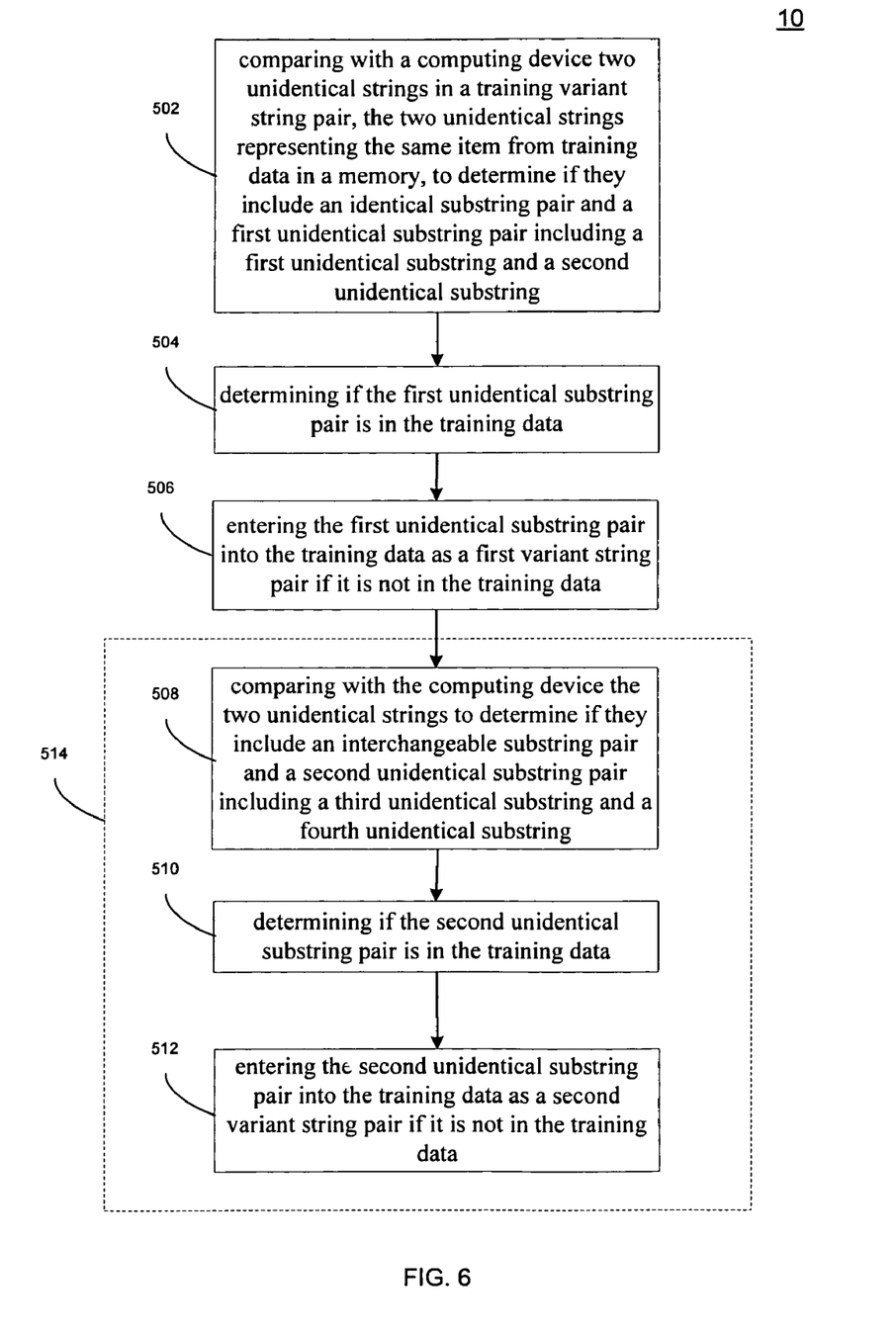
FIG. 6 is a flow chart of the variant string matching process of FIG. 1.

Referring now to FIGS. 2 and 6, there is shown one exemplary embodiment of variant string matching process 10 as shown in FIG. 1. As discussed above and as will be discussed below in greater detail, variant string matching process 10 may compare two unidentical strings in training variant string pair 102. The two unidentical strings may represent the same item from training data 104, which may be stored in a memory, e.g., storage device 24, storage device 26, storage device 28, or storage device 30 of FIG. 1. Training data 104 may include a plurality of unidentical pairs of strings which have been determined to represent the same name or word by any language expert, linguist, or any other person, or by a computer program configured to determine different versions of the same name. The term "item" may refer to, by way of example and not limitation, a word or name.

The two unidentical strings may be compared to determine if they include identical substring pair 106, and first unidentical substring pair 108. Further variant string matching process 10 may also determine if first unidentical substring pair 108 includes first unidentical substring 110 and second unidentical substring 112. It may also determine if first unidentical substring pair 108 is in training data 104. First unidentical substring pair 108 may be entered into training data 104 as first variant string pair 114 if it is not in training data 104.

Further, the two unidentical strings in training variant string pair 102 may be predetermined to represent the same item from training data 104. For example, the names zolfaqari and zolfogary may be different versions of the same name. Many names may have many possible spellings in many different languages. The two unidentical strings in training variant string pair 102 may be determined to represent the same name by any language expert, linguist, or any other person, or by a computer program configured to determine different versions of the same name. It should be noted that various exemplary strings and substrings may be used throughout this disclosure and also in the figures, and that the exemplary strings or substrings are used for illustrating purposes as non-limiting examples.

Variant string matching process 10, as shown in FIG. 1, may be used with any language containing any symbols. Any and all strings discussed in this disclosure may include any number of characters. Any and all characters discussed in this disclosure may be any known or unknown symbols in any known or unknown language.

Further, variant string matching process 10 may compare, via a computing device, e.g. server computer 12 or client electronic device (e.g. desktop computer 18, laptop computer 20, notebook computer 22), the two unidentical strings to determine if they include identical substring pair 106, and first unidentical substring pair 108 (502). The string which may be common in each substring of identical substring pair 106 may include any number of characters, and may be defined by a parameter in variant string matching process 10. Each string which may be common in each substring of identical substring pair 106 may be identical if it includes the exact same characters as that of the other string, or if it is otherwise determined to be identical to the other string. For example, each substring of identical substring pair 106 includes the common substring zol, and therefore each substring of identical substring pair 106 is identical. However, if the two unidentical strings in training variant string pair 102 were zolfaqari and zo_lfogary, where "_" may represent a space, or some other identifiable or unidentifiable character that has been determined to be negligible, zol and zo_l could be identical substrings in an identical substring pair.

Further, the common or identical substring in identical substring pair 106 may be a prefix or a suffix. For the purposes of this disclosure, a "prefix" may be a substring of any length of characters which starts at the beginning of the string. The prefix may end in the middle of the string. The remainder of the string which is not the prefix may be the suffix of the string. For the purposes of this disclosure, a "suffix" may be a substring of any length of characters which ends at the end of the string. The suffix may start in the middle of the string. The remainder of the string which is not the suffix may be the prefix of the string. Further, any string or substring referred to in this disclosure may be a prefix or suffix.

Variant string matching process 10 may determine, via a computing device, e.g. server computer 12 or client electronic device (e.g. desktop computer 18, laptop computer 20, notebook computer 22), if training variant string pair 102 includes first unidentical substring pair 108. First unidentical substring pair 108 may be any portion of the two unidentical substrings in training variant string pair 102 that may be determined not to be part of identical substring pair 106. For example, if training variant string pair 102 includes the strings zolfaqari and zolfogary, and identical substring pair 106 includes the common or identical string zol, then first unidentical substring pair 108 may include the substrings faqari and fogary. The common or identical string may be a prefix or suffix. Further the substrings faqari and fogary may be first unidentical substring 110 and second unidentical substring 112, respectively. First unidentical substring 110 and second unidentical substring 112 may also be a prefix or a suffix.

Additionally, variant string matching process 10 may, via a computing device, e.g. server computer 12 or client electronic device (e.g. desktop computer 18, laptop computer 20, notebook computer 22), determine if first unidentical substring pair 108 is in the training data 104 (504). Variant string matching process 10 may also determine if either of first unidentical substring 110 and second unidentical substring 112 are in training data 104. Variant string matching process 10 may use any known or unknown searching, parsing, scanning method, or any other method known or unknown to those of ordinary skill in the art to determine if any of first unidentical substring pair 108, first unidentical substring 110, or second unidentical substring 112 are in training data 104. If any of first unidentical substring pair 108, first unidentical substring 110, or second unidentical substring 112 are not in training data 104, first unidentical substring pair 108, first unidentical substring 110, or second unidentical substring 112 may be entered into training data 104 as first variant string pair 114 (506).

Figure 3:
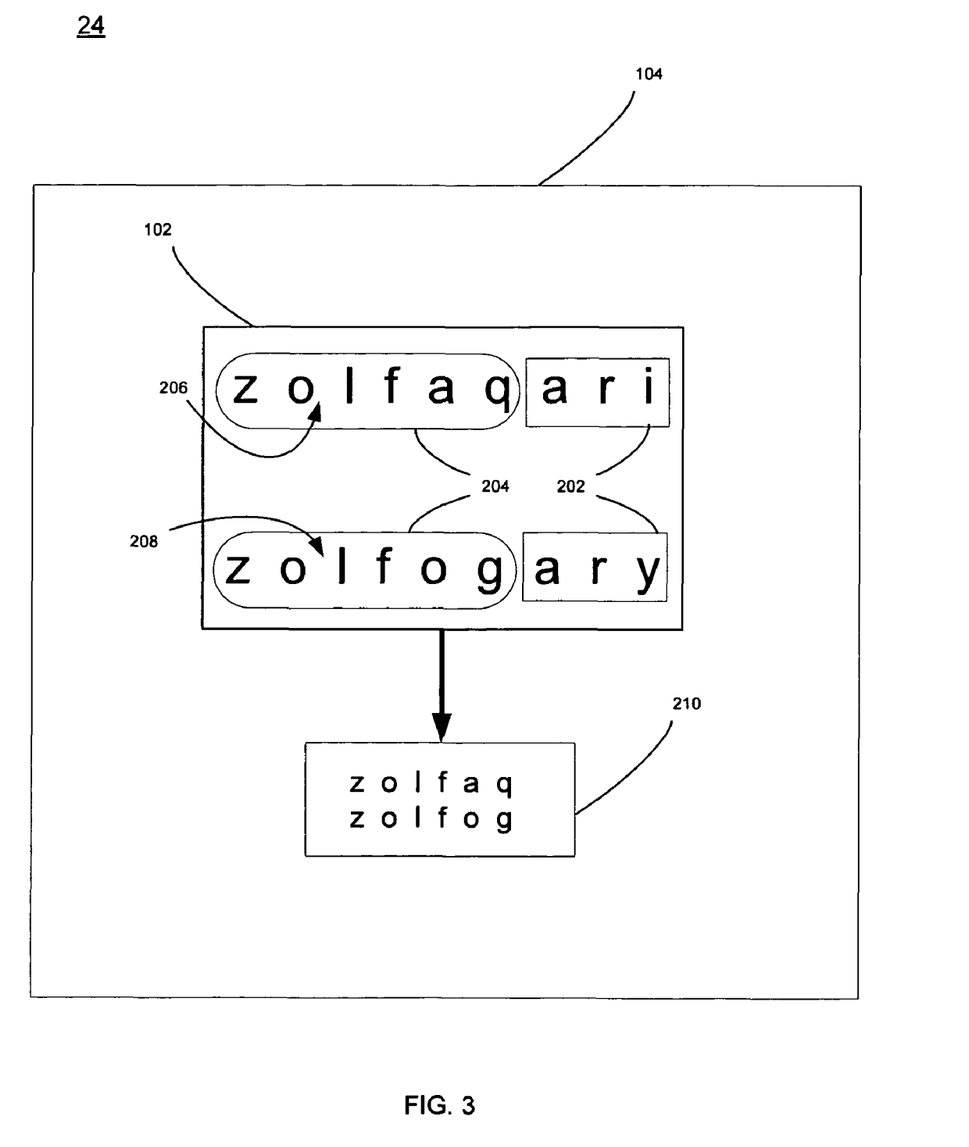
FIG. 3 is a more-detailed diagrammatic view of an embodiment of the variant string matching process of FIG. 1.

Referring now to FIGS. 3 and 6, there is shown another implementation of variant string matching process 10 as shown in FIG. 1. As discussed above and as will be discussed below in greater detail, variant string matching process 10 may compare two unidentical strings in training variant string pair 102 to determine if they include interchangeable substring pair 202 and second unidentical substring pair 204. Variant string matching process 10 may determine if second unidentical substring pair 202 includes third unidentical substring 206 and fourth unidentical substring 208. Variant string matching process 10 may also determine if second unidentical substring pair 204 is in training data 104, and may enter second unidentical substring pair 204 into training data 104 as second variant string pair 210 if it is not in training data 104.

Variant string matching process 10 may, via a computing device, e.g. server computer 12 or client electronic device (e.g. desktop computer 18, laptop computer 20, notebook computer 22), compare two unidentical strings in training variant string pair 102 to determine if they include interchangeable substring pair 202 and second unidentical substring pair 204 (508). Interchangeable substring pair 202 may be a variant string pair such variant string pair 114, first unidentical substring pair 108, or second variant string pair 210, that has been entered into training data 104. Interchangeable substring pair 202 may include any substrings which may be substituted for one another and still have an acceptable spelling or otherwise represent the same name or word. Interchangeable substring pair 202 may have been entered into training data 104 by variant string matching process 10 as discussed with regard to FIG. 2 or by any other process, method, program, or manually. Interchangeable substring pair 202 may have been determined to represent interchangeable substrings by any language expert, linguist, or any other person, or by a computer program configured to determine interchangeable substrings.

Further, second unidentical substring pair 204 may be any portion of the two unidentical substrings in training variant string pair 102 that may be determined not to be part of interchangeable substring pair 202. For example, if training variant string pair 102 includes the strings zolfaqari and zolfogary, and interchangeable substring pair 202 includes interchangeable substrings ari and ary, then second unidentical substring pair 204 may include substrings zolfaq and zolfog. The interchangeable substrings may be prefixes or suffixes. Further, substrings zolfaq and zolfog may be third unidentical substring 206 and fourth unidentical substring 208, respectively. Third unidentical substring 206 and fourth unidentical substring 208 may also be a prefix or a suffix.

Additionally, variant string matching process 10 may, via a computing device, e.g. server computer 12 or client electronic device (e.g. desktop computer 18, laptop computer 20, notebook computer 22), determine if second unidentical substring pair 204 is training data 104 (510). Variant string matching process 10 may also determine if either of third unidentical substring 206 and fourth unidentical substring 208 are in training data 104. Variant string matching process 10 may use any known or unknown searching, parsing, scanning method, or any other method known or unknown to those of ordinary skill in the art to determine if any of second unidentical substring pair 204, third unidentical substring 206, or fourth unidentical substring 208 are in training data 104. If any of second unidentical substring pair 204, third unidentical substring 206, or fourth unidentical substring 208 are not in training data 104, second unidentical substring pair 204, third unidentical substring 206, or fourth unidentical substring 208 may be entered into training data 104 as second variant string pair 210 (512).

It should be noted that each block of the flowchart illustrations, e.g. FIG. 6, and/or block diagrams, and combinations of blocks in the flowchart illustrations and/or block diagrams may be performed in any order and/or independently (e.g., 514). For example, the details of variant string matching process 10, e.g. those described in FIG. 2 and FIG. 3 and described in blocks 502-506 and 508-512, respectively, may be performed independently in various implementations and may be independently used to augment the training data.

Figure 4:
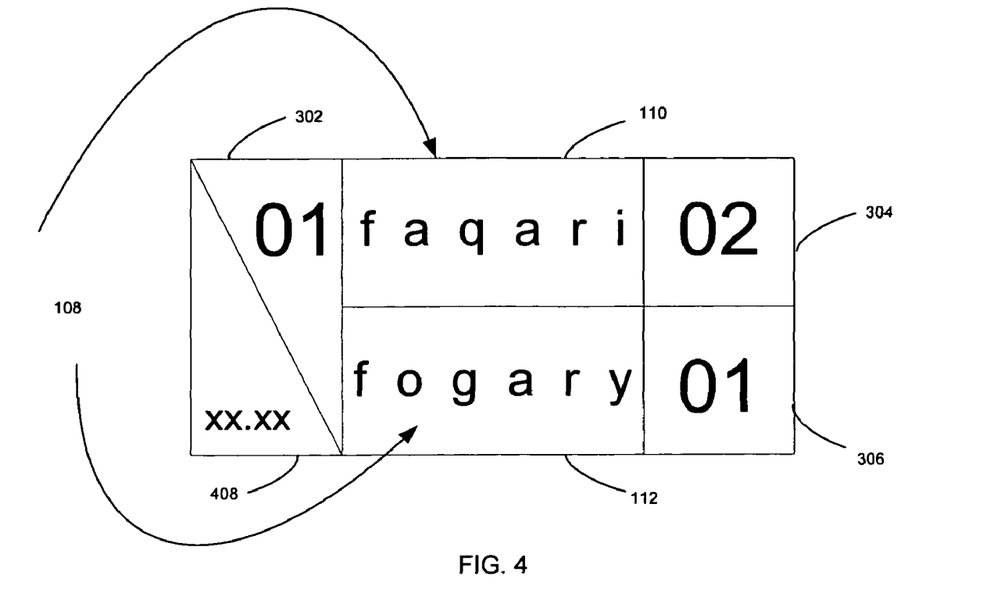
FIG. 4 is a more-detailed diagrammatic view of an embodiment in the variant string matching process of FIG. 1.
Figure 5:
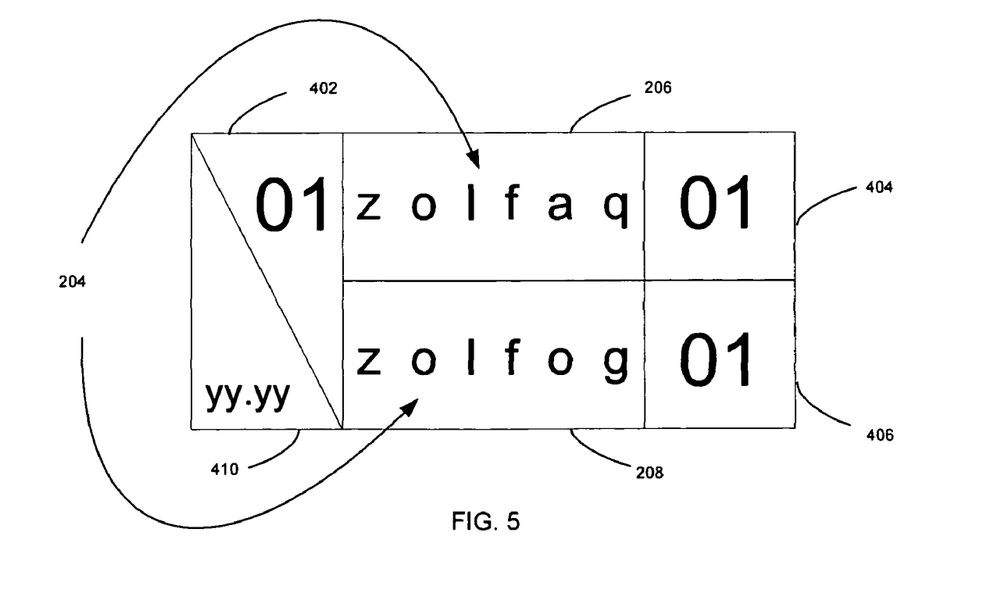
FIG. 5 is a more-detailed diagrammatic view of an embodiment in the variant string matching process of FIG. 1.

Referring now to FIGS. 4, 5 and 6, there are shown two other exemplary embodiments of variant string matching process 10, as shown in FIG. 1. A number of counters may be configured to increment based upon, at least in part, training data 104, and any or all of the counters may be incremented in variant string matching process 10. For example, first pair counter 302 may be configured to increment if first unidentical substring pair 108 is in training data 104. First substring counter 304 may be configured to increment if first unidentical substring 110 is in training data 104. Second substring counter 306 may be configured to increment if second unidentical substring 112 is in training data 104. Second pair counter 402 may be configured to increment if second unidentical substring pair 204 is in training data 104. Third substring counter 404 may be configured to increment if third unidentical substring 206 is in training data 104. Fourth substring counter 406 may be configured to increment if fourth unidentical substring 208 is in training data 104. Matching score 408 may be generated for each variant string pair in training data 104. Matching score 408 may be based upon, at least in part, at least one of first pair counter 302, first substring counter 304, second substring counter 306, second pair counter 402, third substring counter 404, and fourth substring counter 406.

First pair counter 302 may increment if first unidentical substring pair 108 is not in training data 104. By way of example and not limitation, if variant string matching process 10, via a computing device, e.g. server computer 12 or client electronic device (e.g. desktop computer 18, laptop computer 20, notebook computer 22), determines that first unidentical substring pair 108, e.g., faqari and fogary, are not in training data 104, first pair counter 302 may increment from 00 to 01. If first substring counter 304 is already at 01 because, for example, first unidentical substring 110, e.g., faqari, has previously passed through variant string matching process 10, first substring counter 304 may increment from 01 to 02. Further, if second substring counter 306 is at 00 because second unidentical substring 112, e.g., faqari, may be passing through variant string matching process 10 for the first time, second substring counter 306 may increment from 00 to 01. Matching score 408 may be calculated from, generated from, or other wise based upon, at least in part, first pair counter 302, first substring counter 304, second substring counter 306, second pair counter 402, third substring counter 404, and fourth substring counter 406, or any other counters and/or statistics that may be included in variant string matching process 10. Further, matching score 408 may be calculated using any algorithms known, or unknown to those of ordinary skill in the art.

Similarly, second pair counter 402 may increment from 00 to 01 if variant string matching process 10, via a computing device, e.g. server computer 12 or client electronic device (e.g. desktop computer 18, laptop computer 20, notebook computer 22), determines that second unidentical substring pair 204, e.g. zolfaq and zolfog, are not in training data 104. Third substring counter 404 may increment from 00 to 01 if variant string matching process 10 determines that third unidentical substring 206, e.g., zolfaq, is passing through variant string matching process 10 for the first time, or otherwise is not in training data 104. Further, fourth substring counter 208 may increment from 00 to 01 if variant string matching process 10 determines that fourth unidentical substring 208. e.g., zolfog, is passing through variant string matching process 10 for the first time, or otherwise is not in training data 104. Matching score 410 may be calculated from, or other wise based upon, at least in part, first pair counter 302, first substring counter 304, second substring counter 306, second pair counter 402, third substring counter 404, and fourth substring counter 406, or any other counters and/or statistics that may be included in variant string matching process 10. Further, matching score 410 may be calculated using any algorithms known, or unknown to those of ordinary skill in the art.

As will be discussed below in greater detail, matching scores for variant strings pairs may be used to determine string distance or string similarity in a number of applications. String distance or string similarity may be a metric for measuring an amount or other quantity of difference between two strings or sequences. String distance or string similarity may be an edit distance. For example, if the matching score of a string pair zolfog and zolfaq is 0.5, and the matching score of a string pair ari, and ary is 1.0, then a string distance between strings zolfog misandari and zolfaq misandary may be calculated or otherwise determined as the sum of the corresponding matching scores, where the matching score of identical strings may be equal to 0.0. In this particular example, [matching score of zolfog and zolfaq]+[matching score of misand and misand)+[matching score of ari and ary]=0.5+0.0+1.0=1.5. Further, if the string distance satisfies a string distance threshold or other threshold (e.g., <=2.0), which may be a parameter in variant string matching process 10, then the strings may be determined to be variants of each other. Application specific decisions may be made based any of the matching score, string distance, and/or string distance threshold.

It should be noted that variant string matching process 10 may be run, via a computing device, e.g. server computer 12 or client electronic device (e.g. desktop computer 18, laptop computer 20, notebook computer 22), iteratively, recursively, or otherwise repeated using training data 104. Variant string matching process 10 may also be run a number of times defined by a parameter. Moreover, variant string matching process 10 may receive new sets of training data as an input. Training data 104, and other sets of training data which may be used by variant string matching process 10 may include string pairs which have been determined to represent the same name or word by any language expert, linguist, or any other person, or by a computer program configured to determine different versions of the same name.

Figure 7:
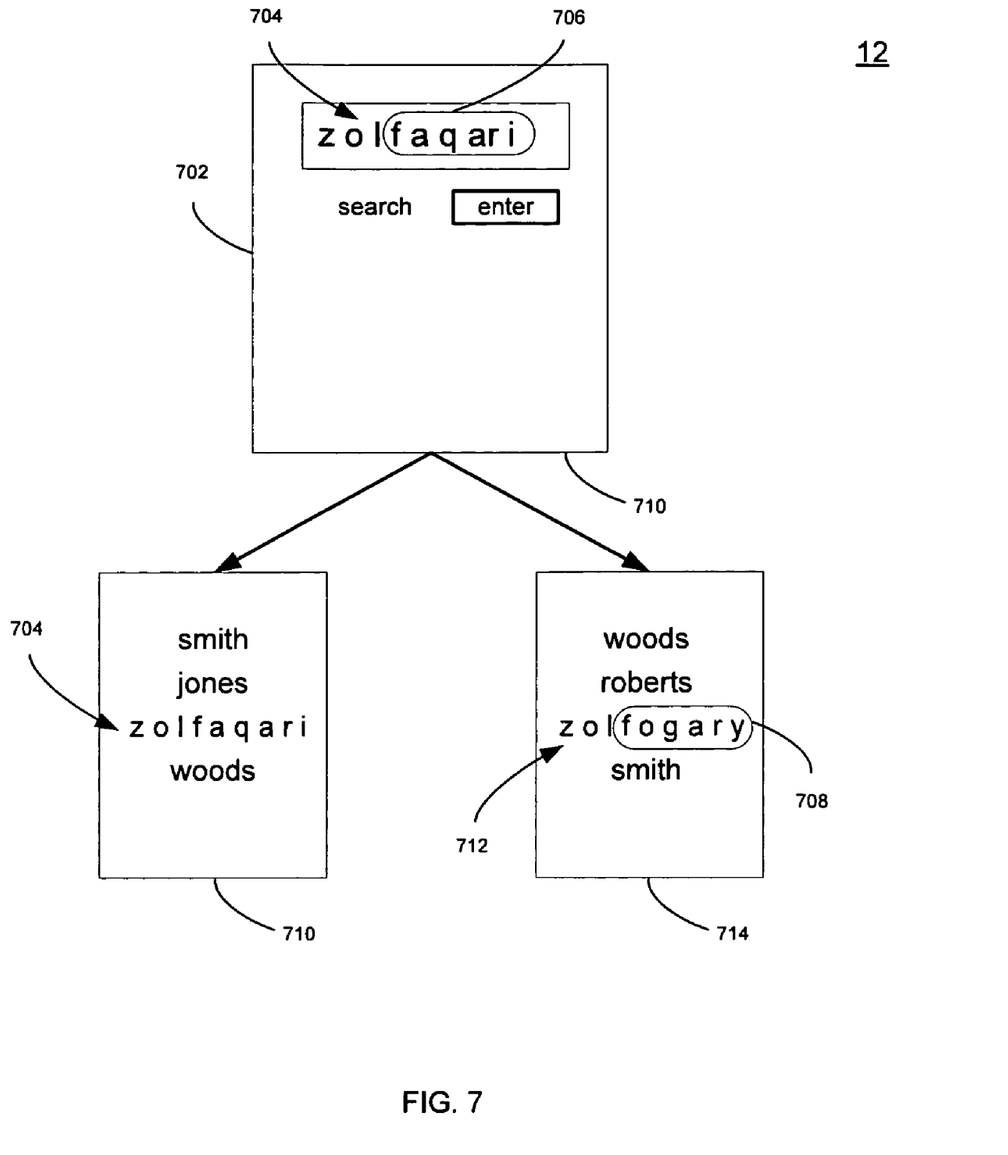
FIG. 7 is a more-detailed diagrammatic view of an implementation of the variant string matching process of FIG. 1.

Referring now to FIG. 7 there is shown an implementation of the variant string matching process 10, as shown in FIG. 1. In one implementation, variant string matching process 10 maybe used in conjunction with, or coupled to, a number of applications. For example variant string matching process 10 running on a computing device, e.g. server computer 12 or client electronic device (e.g. desktop computer 18, laptop computer 20, notebook computer 22), may be used with search application 702 running on a computing device, e.g. server computer 12 or client electronic device, to search for string 704 which may have at least one substring 706. Substring 706 may have at least one variant string 708 and may be included in training data 104.

For illustrative purposes, assume string 704, e.g., zolfaqari, is entered into a search and that the search is executed or otherwise performed or run. String 704 (zolfaqari) may include substring 706, e.g., faqari. The search may incorporate, execute, or otherwise make use of variant string matching process 10, via a computing device, e.g. server computer 12 or client electronic device (e.g. desktop computer 18, laptop computer 20, notebook computer 22). The search may generate or retrieve at least one result 710 including string 704 (zolfaqari). As discussed above, substring 706 (faqari) may have at least one variant string 708, e.g., fogary. Using variant string matching process 10, the search may generate or retrieve at least one result 714 including variant string 712, e.g., zolfogary, or variant string 708 (fogary). The term "result" may refer to any document, email, webpage, article, list, program, blog, newsgroup, message, chat message, text message, spreadsheet, presentation, calendar item, schedule item, task item, invitation, contact item, database or any file.

Figure 8:
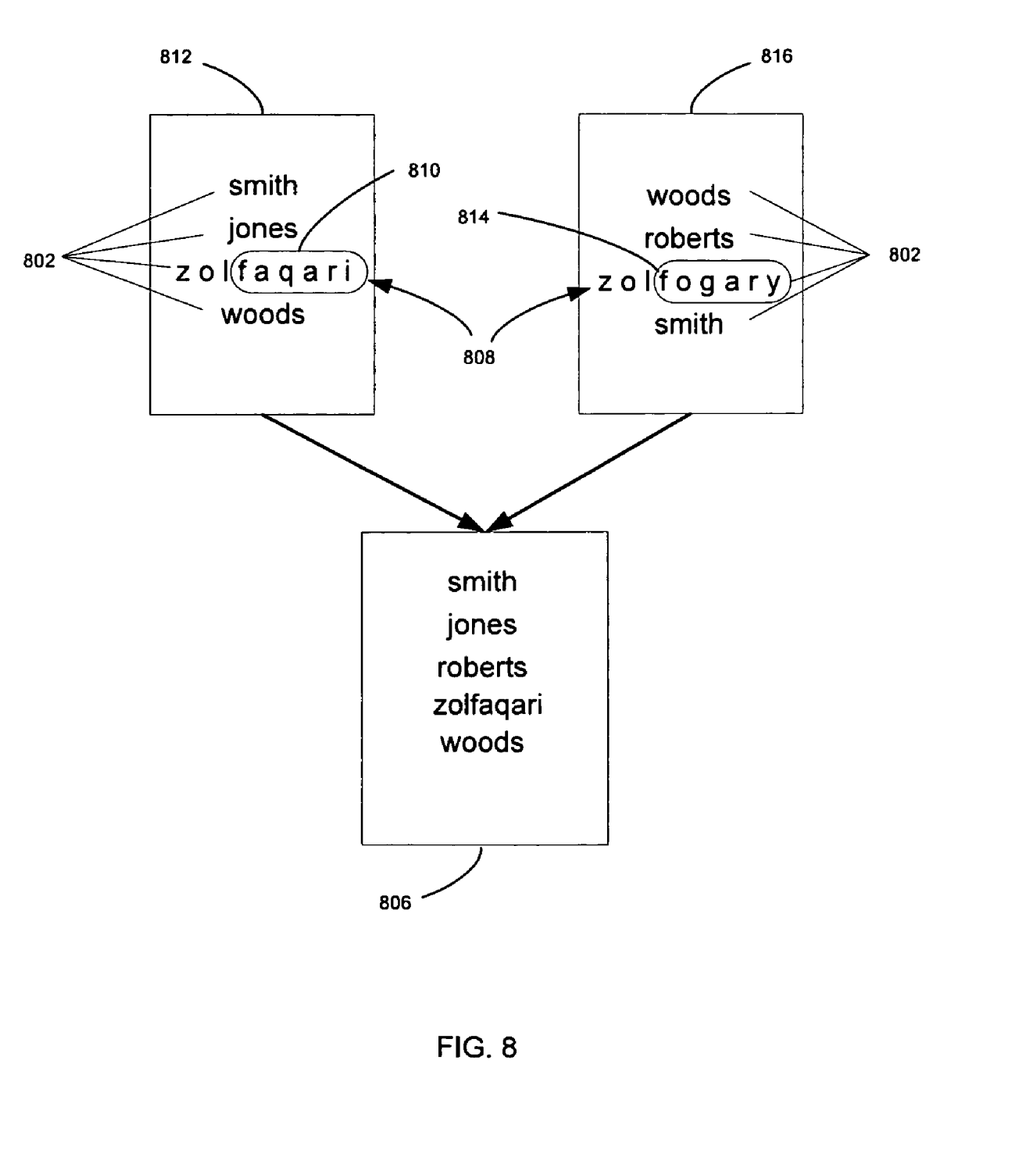
FIG. 8 is a more more-detailed diagrammatic view of an implementation of the variant string matching process of FIG. 1.

Referring now to FIG. 8 there is shown an implementation of variant string matching process 10, as shown in FIG. 1. In another implementation, variant string matching process 10 running on a computing device, e.g. server computer 12 or client electronic device (e.g. desktop computer 18, laptop computer 20, notebook computer 22) may be used with a merging or comparing application running on a computing device, e.g. server computer 12 or client electronic device, to merge strings 802 from at least two sources into one source 806 based upon, at least in part, the matching score for at least one variant string pair 808. Variant string pair 808 may have first substring 810 in first source 812 and second substring 814 in second source 816. A "source" may refer to any document, email, webpage, article, list, program, blog, newsgroup, message, chat message, text message, spreadsheet, presentation, calendar item, schedule item, task item, invitation, contact item, database or any file.

For illustrative purposes, assume there are two sources, e.g., documents. The first document, e.g. first source 812 may include the strings smith, jones, zolfaqari, and woods. The second document, e.g., second source 816 may include the strings woods, roberts, zolfogary, and smith. The strings faqari, e.g. first substring 810 and fogary, e.g. second substring 814 may be in variant string pair 808 included in training data 104. Moreover, variant string pair 808 may have a matching score (not shown) as discussed above. Variant string matching process 10 and/or a merging or comparing application may include a threshold which may be a parameter. Assume for illustrative purposes that the matching score of variant string pair 808 satisfies an appropriate threshold, and a merge is executed, or otherwise performed or run, on the two documents. A merging application may combine the two documents (e.g. 812 and 816) into one document (e.g. 806) including the strings smith, jones, roberts, zolfaqari, and woods.

Figure 9:
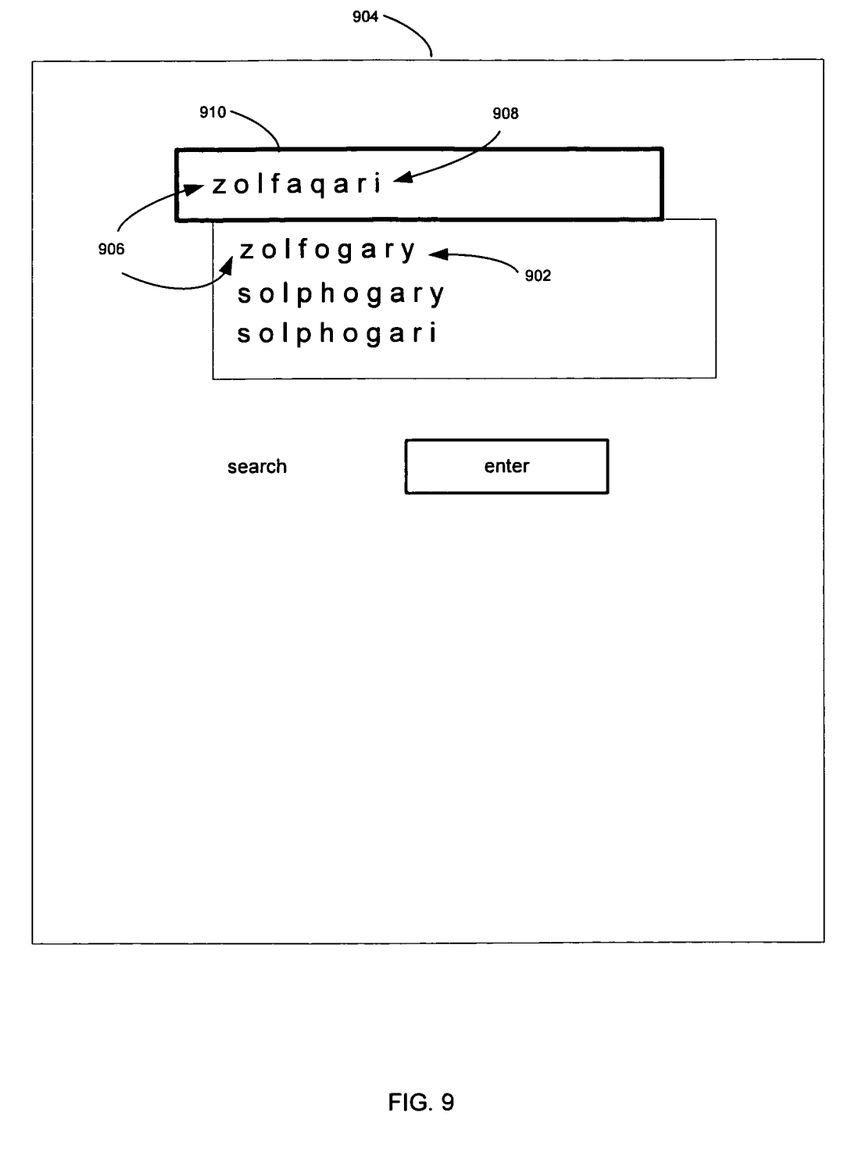
FIG. 9 is a more more-detailed diagrammatic view of an implementation of the variant string matching process of FIG. 1.

Referring now to FIG. 9 there is shown an implementation of variant string matching process 10, as shown in FIG. 1. In another implementation variant string matching process 10 running on a computing device, e.g. server computer 12 or client electronic device (e.g. desktop computer 18, laptop computer 20, notebook computer 22) may be used with graphical user interface 904 running on a computing device, e.g. server computer 12 or client electronic device. Variant string matching process 10 and graphical user interface 904 may dynamically display variant display string 902 in graphical user interface 904, based upon, at least in part, variant display string pair 906. Variant display string pair 906 may include variant display string 902 and string 908 in the graphical user interface 904. The term "dynamically display" may refer to variant display string 902 dynamically updating based on the keystrokes entered into field 910. For example, if zolfaq were entered into field 910, zolfog may be displayed. Any of the searching, merging, or dynamic display applications described above may be configured to make application specific decisions or any decision regarding strings based upon any of the matching score, string distance, and/or string distance threshold.

It should be noted that various terms used herein may have multiple meanings and/or may be synonymous with other terms. For example, the terms "variant string pair", "interchangeable substring pair", "variant display string pair", or any other string pair or substring pair as used herein may also refer to a matching pair or matching pairs. Any and/or all of the counters described herein may also refer to a count, or counts. Any and/or all of the matching scores described herein may refer to a cost, matching cost, penalty, matching penalty, or probability. The term "training data" may also refer to a matching set, training corpse, database, or training database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer implemented method for variant string matching, comprising:

comparing with a computing device two unidentical strings in a training variant string pair, the two unidentical strings representing the same item from training data in a memory, to determine if they include an identical substring pair and a first unidentical substring pair including a first unidentical substring and a second unidentical substring;

determining if the first unidentical substring pair is in the training data;

entering the first unidentical substring pair into the training data as a first variant string pair if it is not in the training data;

comparing with the computing device the two unidentical strings to determine if they include an interchangeable substring pair and a second unidentical substring pair including a third unidentical substring and a fourth unidentical substring;

determining if the second unidentical substring pair is in the training data; and entering the second unidentical substring pair into the training data as a second variant string pair if it is not in the training data.

2. The computer implemented method of claim 1 further comprising incrementing with the computing device at least one of:
   a first pair counter configured to increment if the first unidentical substring pair is in the training data;
   a first substring counter configured to increment if the first unidentical substring is in the training data;
   a second substring counter configured to increment if the second unidentical substring is in the training data;
   a second pair counter configured to increment if the second unidentical substring pair is in the training data;
   a third substring counter configured to increment if the third unidentical substring is in the training data; and
   a fourth substring counter configured to increment if the fourth unidentical substring is in the training data.

3. The computer implemented method of claim 2 further comprising:
   generating with the computing device a matching score for at least one variant string pair in the training data, based upon, at least in part, at least one of the first pair counter, the first substring counter, the second substring counter, the second pair counter, the third substring counter, and the fourth substring counter.

4. The computer implemented method of claim 3 further comprising:
   generating with the computing device a string distance for at least one variant string pair in the training data, based upon, at least in part, a matching score generated for at least one of the first unidentical substring pair and the second unidentical substring pair.

5. The computer implemented method of claim 4 further comprising:
   searching with the computing device for a string having at least one substring, the at least one substring having at least one variant string included in the training data; and
   generating with the computing device at least one result including the at least one variant string.

6. The computer implemented method of claim 5 further comprising:
   merging a plurality of strings from at least two sources into one source based upon, at least in part, the matching score for at least one variant string pair having a first substring in a first source and a second substring in a second source.

7. The computer implemented method of claim 6 further comprising:
   dynamically displaying a variant display string in a graphical user interface, based upon, at least in part, a variant display string pair including the variant display string and a string in the graphical user interface.

8. A computer program product residing on a non-transitory computer readable medium having a plurality of instructions stored thereon, which, when executed by a processor, cause the processor to perform operations comprising:
   comparing two unidentical strings in a training variant string pair, the two unidentical strings representing the same item from training data in a memory, to determine if they include an identical substring pair and a first unidentical substring pair including a first unidentical substring and a second unidentical substring;
   determining if the first unidentical substring pair is in the training data; and
   entering the first unidentical substring pair into the training data as a first variant string pair if it is not in the training data
   comparing the two unidentical strings to determine if they include an interchangeable substring pair and a second unidentical substring pair including a third unidentical substring and a fourth unidentical substring;
   determining if the second unidentical substring pair is in the training data; and
   entering the second unidentical substring pair into the training data as a second variant string pair if it is not in the training data.

9. The computer program product of claim 8 further comprising instructions for incrementing at least one of:
   a first pair counter configured to increment if the first unidentical substring pair is in the training data;
   a first substring counter configured to increment if the first unidentical substring is in the training data;
   a second substring counter configured to increment if the second unidentical substring is in the training data;
   a second pair counter configured to increment if the second unidentical substring pair is in the training data;
   a third substring counter configured to increment if the third unidentical substring is in the training data; and
   a fourth substring counter configured to increment if the fourth unidentical substring is in the training data.

10. The computer program product of claim 9 further comprising instructions for:
    generating a matching score for each variant string pair in the training data, based upon, at least in part, at least one of the first pair counter, the first substring counter, the second substring counter, the second pair counter, the third substring counter, and the fourth substring counter.

11. The computer program product of claim 10 further comprising instructions for:
    generating with the computing device a string distance for at least one variant string pair in the training data, based upon, at least in part, a matching score generated for at least one of the first unidentical substring pair and the second unidentical substring pair.

12. The computer program product of claim 11 further comprising instructions for:
    searching for a string having at least one substring, the at least one substring having at least one variant string included in the training data; and
    generating at least one result including the at least one variant string.

13. The computer program product of claim 12 further comprising instructions for:
    merging a plurality of strings from at least two sources into one source based upon, at least in part, the matching score for at least one variant string pair having a first substring in a first source and a second substring in a second source.

14. The computer program product of claim 13 further comprising instructions for:
    dynamically displaying a variant display string in a graphical user interface, based upon, at least in part, a variant display string pair including the variant display string and a string in the graphical user interface.

* * * * *